(12) United States Patent
Bruno et al.

(10) Patent No.: US 7,340,994 B2
(45) Date of Patent: Mar. 11, 2008

(54) GRILLING APPARATUS

(75) Inventors: Adrian A. Bruno, Rolling Meadows, IL (US); Mario Gonzalez, Elgin, IL (US)

(73) Assignee: Weber-Stephen Products Co., Palatine, IL (US)

( * ) Notice: Subject to any disclaimer, the term of this patent is extended or adjusted under 35 U.S.C. 154(b) by 355 days.

(21) Appl. No.: 10/872,761

(22) Filed: Jun. 21, 2004

(65) Prior Publication Data

US 2006/0150827 A1 Jul. 13, 2006

Related U.S. Application Data

(60) Provisional application No. 60/480,920, filed on Jun. 24, 2003.

(51) Int. Cl.
*A47J 37/00* (2006.01)

(52) U.S. Cl. .............................. 99/450; 99/426; 99/444

(58) Field of Classification Search .................. 99/339, 99/340, 400, 401, 426, 422–425, 444–450; 126/25 R, 9 R
See application file for complete search history.

(56) References Cited

U.S. PATENT DOCUMENTS

| 1,899,682 | A | * | 2/1933 | Goldenberg | 99/445 |
|---|---|---|---|---|---|
| 2,135,782 | A | * | 11/1938 | McBirney | 99/450 |
| 4,173,179 | A | * | 11/1979 | Arthur | 99/374 |
| 4,176,591 | A | * | 12/1979 | Power | 99/430 |
| 4,352,324 | A | * | 10/1982 | Noh | 99/425 |
| 4,510,855 | A | | 4/1985 | Avnre | |
| 4,565,122 | A | * | 1/1986 | Feuillalay | 99/447 |
| 5,467,696 | A | * | 11/1995 | Everhart | 99/425 |
| 5,490,452 | A | | 2/1996 | Schlosser et al. | |
| 5,584,236 | A | * | 12/1996 | Margolis | 99/425 |
| 5,884,555 | A | * | 3/1999 | Chang | 99/425 |
| 5,974,953 | A | * | 11/1999 | Messerli | 99/340 |
| 5,983,786 | A | | 11/1999 | Brown | |
| 6,196,115 | B1 | * | 3/2001 | Tsao | 99/339 |
| 6,481,343 | B1 | | 11/2002 | Rigney et al. | |

(Continued)

FOREIGN PATENT DOCUMENTS

AU 44665/93 2/1994

(Continued)

OTHER PUBLICATIONS

Weber-Stephen Products Co. International Search Report for corresponding PCT Application No. PCT/US2004/020041, undated.

(Continued)

*Primary Examiner*—Timothy F. Simone
(74) *Attorney, Agent, or Firm*—David I. Roche; Daniel A. Tallitsch; Baker & McKenzie LLP

(57) ABSTRACT

A grill apparatus for cooking small and delicate food is provided. The grill apparatus is a cooking grate having a plurality of apertures extending through the cooking area of the cooking grate. Because of the location and dimension of the apertures, a continuous line of the cooking area extends a length that is substantially less than the distance from one edge of the cooking grate to an opposing edge of the cooking grate to prevent warping of the cooking grate.

23 Claims, 10 Drawing Sheets

U.S. PATENT DOCUMENTS 6,523,460 B1  2/2003  Lange

FOREIGN PATENT DOCUMENTS

| DE | 2714051 A1 | 10/1978 |
|---|---|---|
| DE | 3631372 A1 | 3/1988 |
| EP | 1 285 618 A1 | 2/2003 |

OTHER PUBLICATIONS

Japanese Patent Abstract for Application No. 10289233 filed on Oct. 12, 1998 entitled: "Roaster Device, and Burning Interior Protector for Roaster Device."

* cited by examiner

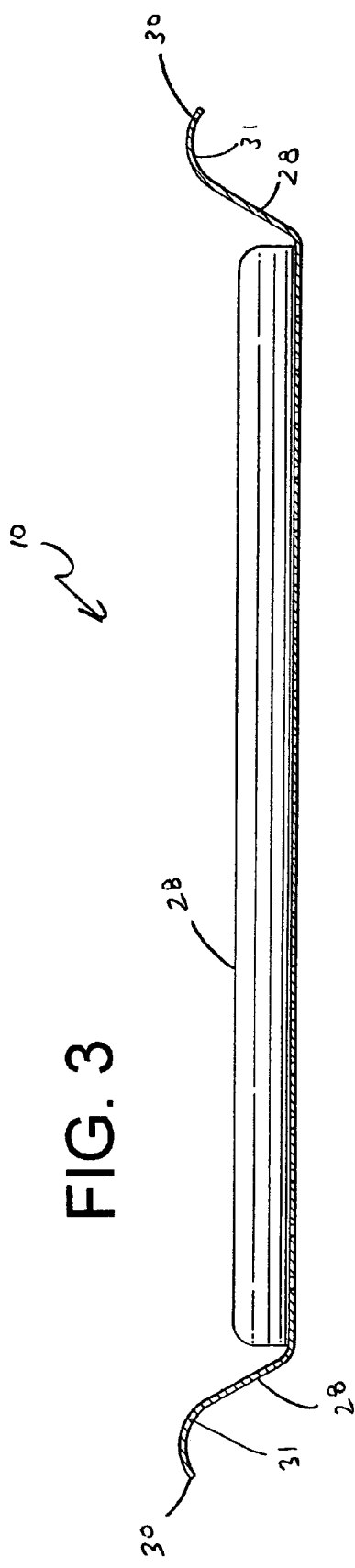
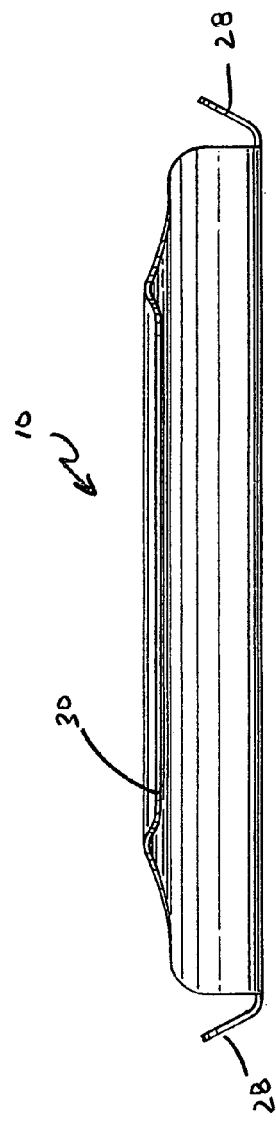

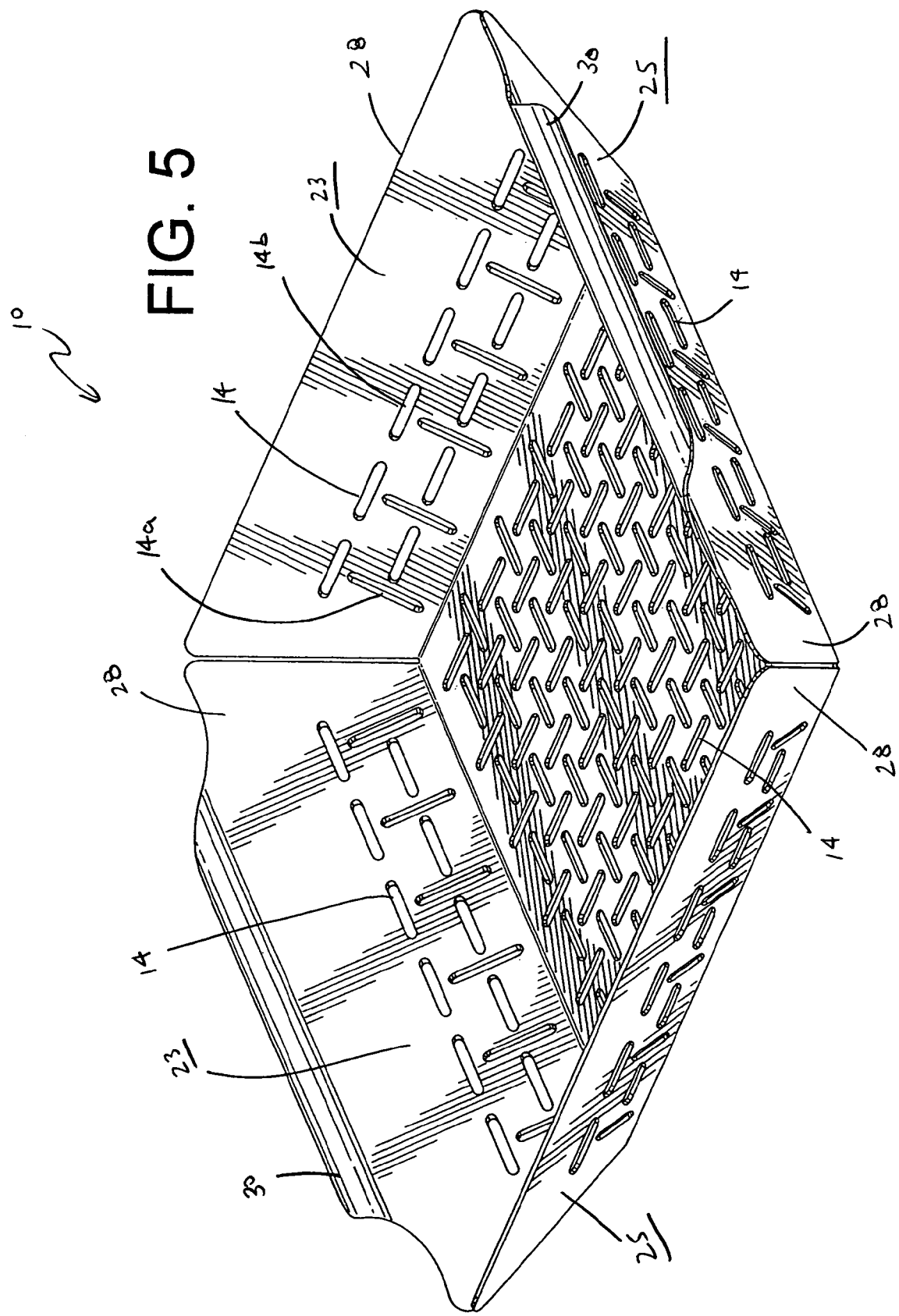

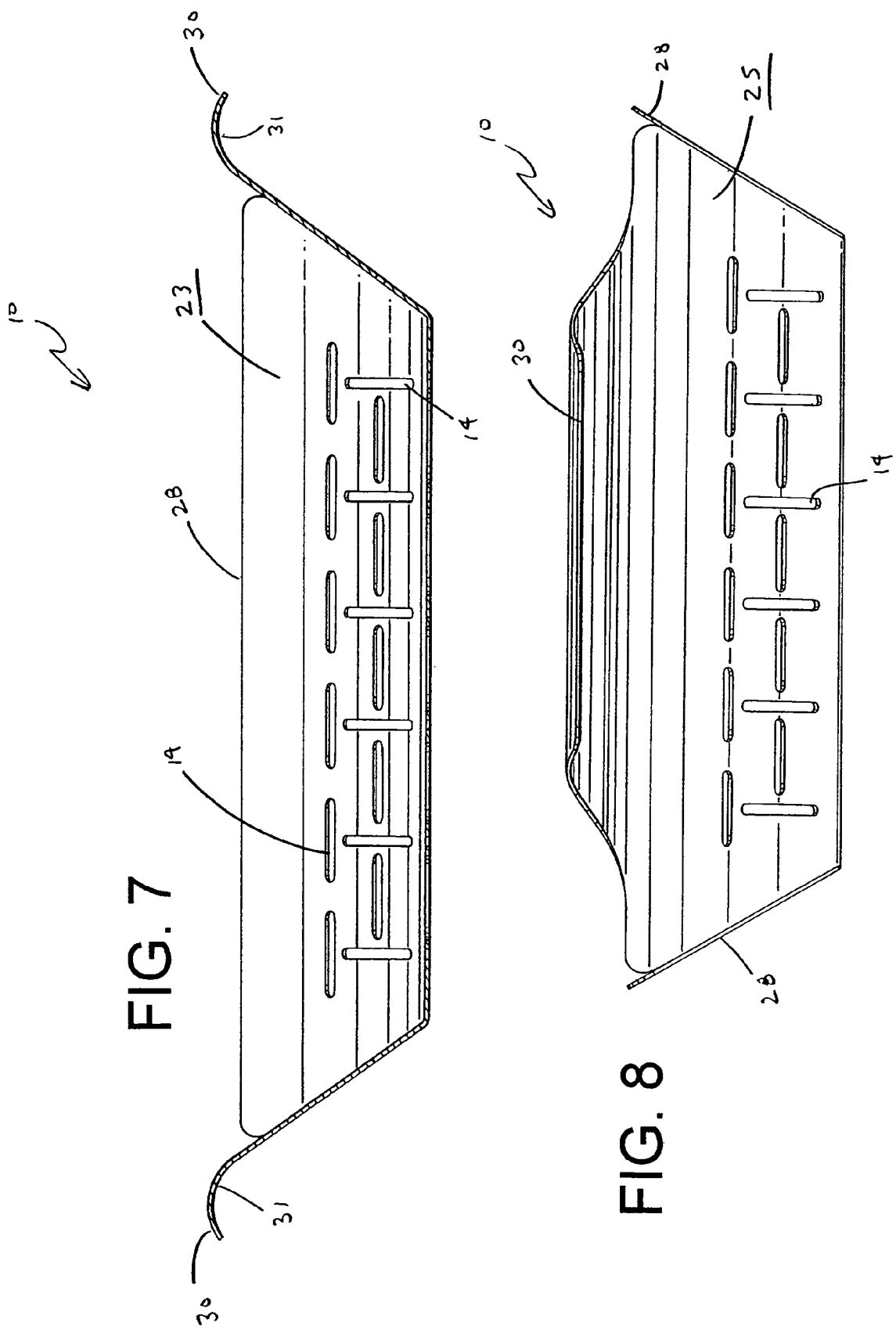

GRILLING APPARATUS

CROSS-REFERENCE TO RELATED APPLICATIONS

This application is a continuation-in-part of U.S. Provisional Application No. 60/480,920 filed on Jun. 24, 2003, which is expressly incorporated herein.

FEDERALLY SPONSORED RESEARCH OR DEVELOPMENT

Not Applicable.

TECHNICAL FIELD

The present invention relates generally to the field of grates for barbecue grills, and more specifically to a removable secondary grate for a barbecue grill, which reduces the rate of potential warping of the grate upon the application of heat and/or moisture.

BACKGROUND OF THE INVENTION

The popularity of barbecue grills and outdoor cooking devices has increased tremendously over the last twenty-five years. Initially, charcoal barbecue grills having combustible solid fuel were utilized to cook food via radiant and convective heat. Subsequently, gas barbecue grills, which employ a gas burner, were utilized. Often, the food to be cooked in both charcoal and gas grills was situated on a grate having numerous elongated members, openings, and cross members which cause the grate to have a grid-like configuration. Accordingly, to cook food in such barbecue grills the radiant and convective heat energy dispelled from either the charcoal or gas burners passed through the cooking grate and were directed to the food. An example of the conventional grate is found in U.S. Pat. No. 5,490,452 to Schlosser et al. There, the grate is formed from a plurality of elongated rods about openings, both of which are within a perimeter defined by a circular ring. Another example of the conventional grate is shown in U.S. Pat. No. 6,481,343 to Rigney et al. There, the grate has a generally rectangular shape with numerous openings and elongated structures.

Conventional grates, including those described above, are adequate for cooking foods which are relatively large in size and which tend to cook in a harmonious mass, such as burgers, steaks, chops, hotdogs, sausage, chicken, etc.

Conventional grates suffer, however, from an inability to cook small and/or delicate foods without the loss of substantial amounts of the small and/or delicate foods through the apertures in the standard grate. For example, fish tends to flake when cooked, and when cooked on a conventional grate, the fish is inadequately supported and tends to fall through the apertures in the grate. Similarly, sliced or chopped vegetables are often cooked on a barbecue grill to obtain a distinctive flavor and appeal, however, these smaller items also tend to fall through the cooking grate, making outdoor cooking of these items extremely frustrating.

Various attempts have been made to develop devices for cooking or grilling specialty foods items, particularly small food items, on outdoor barbecue grills. Many of these devices suffer from additional deficiencies. For example, U.S. Pat. No. 4,510,855 to Avner describes a secondary grilling apparatus, which comprises a flat sheet of metal with rectangular openings that clips onto the bars of conventional barbecue grills. The sheet provides a secondary area for grilling with smaller openings. However, the device cannot be easily taken out of the barbecue grill while hot. Further, the perforation design on the grate of the '855 patent may allow thermal stresses to accumulate and cause potential warping of the cooking area.

A second prior art device is disclosed in U.S. Pat. No. 5,983,786 to Brown. The '786 patent discloses a food pan for placing on the grate of a barbecue grill for permitting grilling of small foods which would otherwise fall through a conventional grate of a grill. The food pan of the '786 patent includes a plate member with plurality of apertures extending through the upper and lower surfaces of the plate member to permit heat and smoke to reach food on the plate member. The apertures of the plate member are arranged in grid-like fashion having a plurality of columns and rows. The columns extend between the ends of the plate member, and the rows extend between the sides of the plate member. Because of this design, the aperture design of the '786 patent may also allow thermal stresses in the plate member to accumulate and cause potential warping of the cooking area.

Another prior art device is shown in FIGS. 14 and 15 of this disclosure. This device is similar to the device disclosed in the '786 patent in that the plate member has a plurality of apertures arranged in a grid-like fashion having a plurality of rows and columns. Like the design of the '786 patent, this design has the same deficiencies; the cooking area could warp due to the accumulation of thermal stresses. One way in which manufacturers of these prior art devices attempted to control warping was to weld the sidewalls together in an attempt to make the basket more rigid. Unfortunately, this does not entirely solve the warping problem. Moreover, it adds unnecessary cost, and does not work with flat devices.

Accordingly, a simple and inexpensive griddle device for cooking small and delicate foods reduces warping under heat and/or moisture in accordance with the present invention will provide an apparatus that attempts to eliminate the drawbacks of prior grate devices.

SUMMARY OF THE INVENTION

In order to obtain an optimal grilling/cooking flavor for barbecue-grilled items, it is preferred that the items are cooked on a surface having apertures to allow heated air and/or smoke to pass through the apertures to cook the food. The present invention provides a grate for barbecue grills that allows small and/or delicate foods to be cooked on barbecue grills to obtain the grilled flavor. The embodiments disclosed are relatively inexpensive and are easy to manufacture and use with a barbecue grill. Further, the present grilling apparatus can be utilized in conjunction with a conventional grate, or in place of a conventional grate.

According to an aspect of one embodiment, the grilling apparatus provides a cooking area for small and/or delicate foods that reduces the rate of potential warping of the grilling apparatus upon the application of heat and/or moisture. In one embodiment, the grilling apparatus comprises a cooking grate having a grilling area with a plurality of apertures extending therethrough. The apertures extend transverse to one another.

According to another aspect of one embodiment, the cooking area has a perimeter that is positioned a distance from an edge of the cooking grate. A plurality of apertures extend through the cooking area and are arranged on the cooking grate to preclude uninterrupted extension of a transverse plane across the cooking area of the cooking grate.

According to another aspect of one embodiment, the cooking grate has a first edge, a second edge opposing the first edge, a third edge, and a fourth edge opposing the third edge. The cooking area is located between the edges of the cooking grate. A plurality of apertures extend through the cooking area of the cooking grate. The location of the apertures on the cooking grate precludes uninterrupted extension of a transverse plane across the cooking area and between the apertures thereof.

According to another aspect of one embodiment, the grilling apparatus comprises a cooking grate having a plurality of opposing edges, a cooking area positioned between the opposing edges, and a plurality of apertures extending through the cooking area. A continuous line of the cooking area extends a length between the apertures, and the length of the continuous line of the cooking area is substantially less than the distance from one edge of the cooking grate to an opposing edge of the cooking grate.

According to another aspect of one embodiment, the grilling apparatus comprises a cooking grate having a plurality of apertures extending through the cooking grate, and a cooking area of the cooking grate extending around the apertures. The apertures are dimensioned such that any continuous line of the cooking area between the apertures and extending in a first direction extends a distance less than 40% of an overall length of the cooking grate in the first direction.

According to another aspect of one embodiment, the grilling apparatus includes at least one sidewall extending at an angle from the cooking grate. The sidewall depends from one of the edges of the cooking grate. In one embodiment, a plurality of apertures is also located in the sidewall.

According to another aspect of one embodiment, the sidewalls of the grilling apparatus are not directly connected to an adjacent sidewall.

According to another aspect of one embodiment, the apertures in the grilling apparatus are elongated in shape, and extend transverse to one another.

According to another aspect of one embodiment, the grilling apparatus can be made of any shape, including square, round, rectangular, polygonal, etc.

According to another aspect of one embodiment, the grilling apparatus can be utilized as a removable secondary grate for a conventional barbecue grill.

According to another aspect of one embodiment, the grilling apparatus can be used with a conventional grilling area without any alteration of the primary grill or grilling area.

According to another aspect of one embodiment, the grilling apparatus provides a grilling area suitable for cooking small and/or delicate foods which does not interfere with the interaction between the food and the aromatic substances contained in the cooking gases of the barbecue grill.

According to yet another aspect of one embodiment, the grilling apparatus provides a grilling area that can be conveniently placed on or off a hot primary grill by means of handles, which reduces warping of the grilling apparatus.

Other features and advantages will be apparent from the following specification taken in conjunction with the following drawings.

BRIEF DESCRIPTION OF THE DRAWINGS

To understand the present invention, it will now be described by way of example, with reference to the accompanying drawings in which:

FIG. 3 is a cross-sectional elevation view along line 3-3 of FIG. 2;

FIG. 4 is an end elevation view of the grilling apparatus of FIG. 1;

FIG. 5 is a perspective view of another embodiment of the grilling apparatus;

FIG. 7 is a cross-sectional elevation view along line 7-7 of FIG. 6;

FIG. 8 is an end elevation view of the grilling apparatus of FIG. 5;

DETAILED DESCRIPTION OF THE INVENTION

Figure 1:
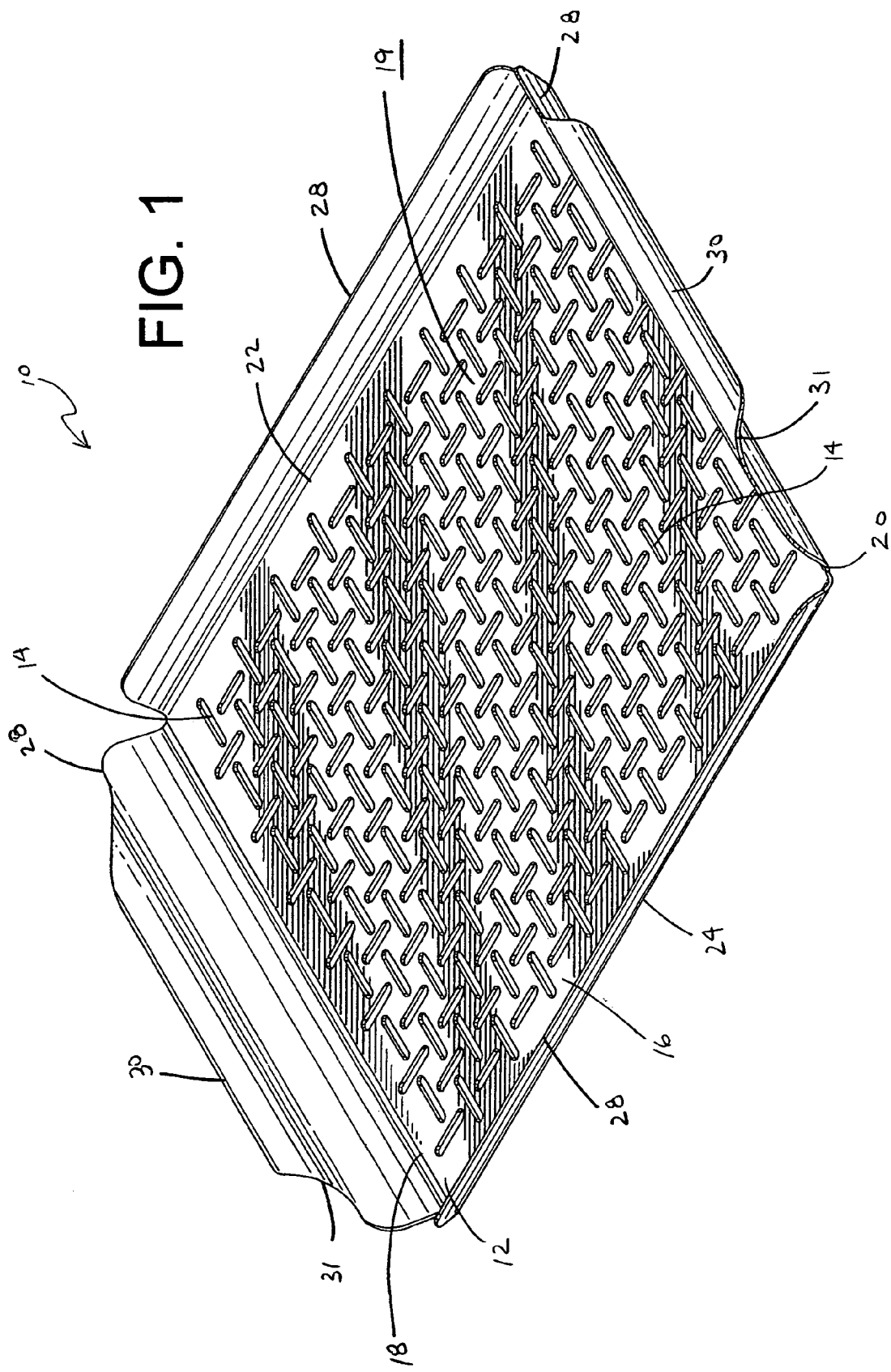
FIG. 1 is a perspective view of one embodiment of the grilling apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now in detail to the figures, and initially to FIG. 1, there is shown a grilling apparatus, generally designated by reference numeral 10. The grilling apparatus 10 generally comprises a cooking grate 12, a plurality of apertures 14 extending through the cooking grate 12, and a cooking area 16. While the embodiments illustrated in the Figures are shown as rectangular cooking grates 12, the cooking grate could have any shape, including oblong, round, polygonal, etc. Typically, the cooking area 16 of the cooking grate 12 is substantially flat.

In the preferred embodiment, the cooking grate 12 has a first edge 18, a second edge 20 opposing the first edge 18, a third edge 22, and a fourth edge 24 opposing the third edge 22. If, for example, the cooking grate 12 were round, it may only have one continuous edge 18. Additionally, in a preferred embodiment the cooking grate 12 is made of a substantially flat sixteen gauge stainless steel, however one of ordinary skill in the art would understand that virtually any metal, and specifically any sheet metal, and any thickness may be available for use with the present invention. Additionally, it is understood that the metal may be coated.

The cooking grate 12 may have sidewalls and handles. In the embodiment illustrated in FIGS. 1-8, sidewall components 28 extend at an angle from the edges 18, 20, 22, and 24 of the cooking grate 12. The cooking grate 12 may also have handles 30 for lifting the cooking grate 12. The handles 30 have a radiused portion 31 and generally extend from the sidewalls 28. In the embodiment of FIGS. 1-4, the handles 30 extend from the sidewalls 28 adjacent the first and second opposing edges 18, 20 of the cooking grate 12. Similarly, in the embodiment illustrated in FIGS. 5-8 the handles 30 extend from each of the sidewalls 28 adjacent the first and second opposing edges 18, 20 of the cooking grate 12. As disclosed in another embodiment of the cooking grate 12 in FIGS. 5-8, the sidewalls 28 may be enlarged, and the sidewalls 28 may have the apertures 14 of the present invention incorporated therein.

The cooking area 16 of the cooking grate 12 is generally provided in the central region of the cooking grate 12 and adjacent the apertures 14 in the cooking grate 12. Further, the cooking area 16 has a perimeter that is positioned between the edges 18, 20, 22, 24 of the cooking grate 12, and more preferably a distance from the edges 18, 20, 22, 24 of the cooking grate 12. Generally, the perimeter of the cooking area 16 extends adjacent the outer apertures 14 in the cooking grate 12. The top surface 19 of the cooking area 16 is generally referred to as the cooking surface 19, because this is the surface 19 that the food is placed on for cooking thereof.

Figure 2:
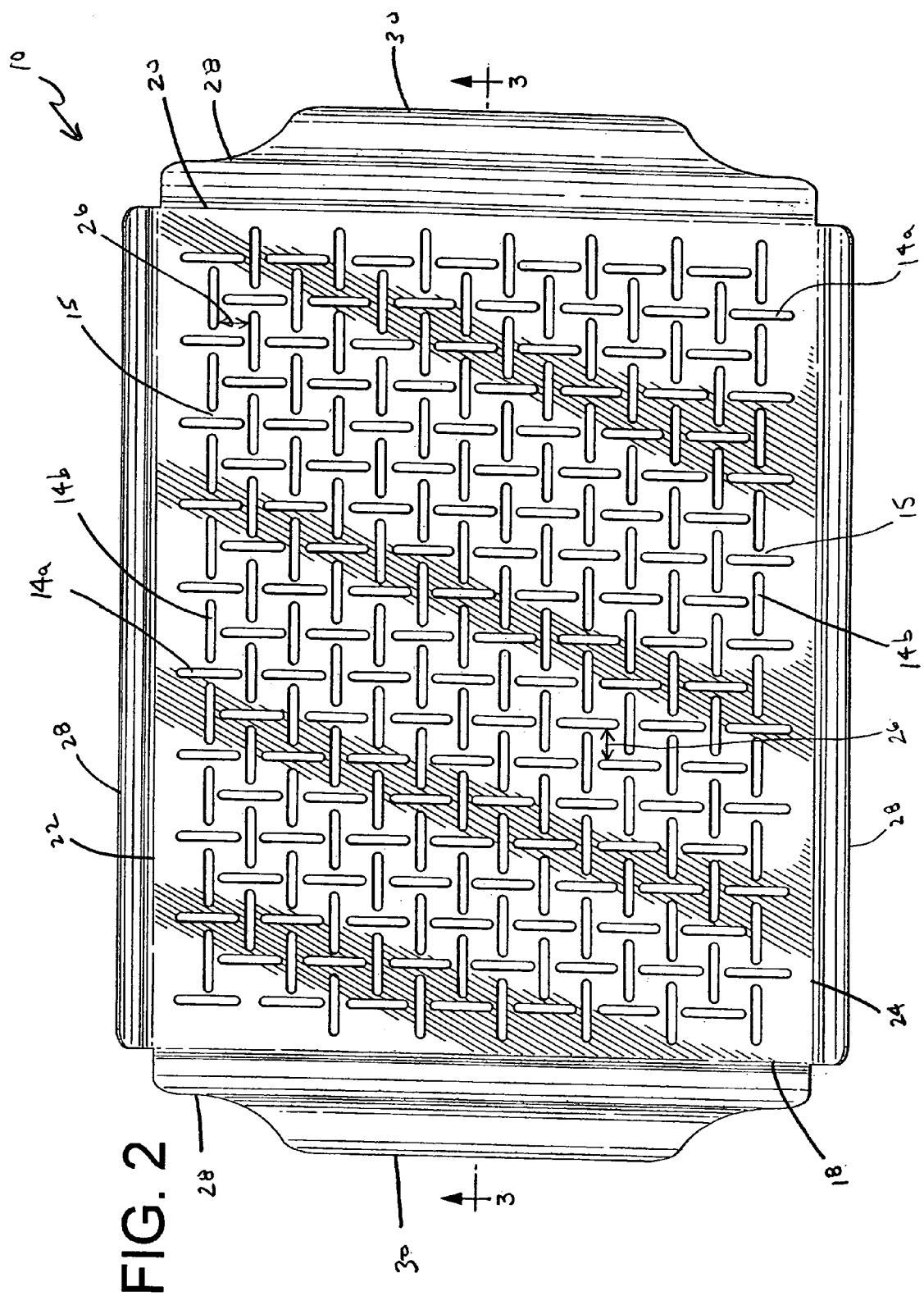
FIG. 2 is a top plan view of the grilling apparatus of FIG. 1.
Figure 6:
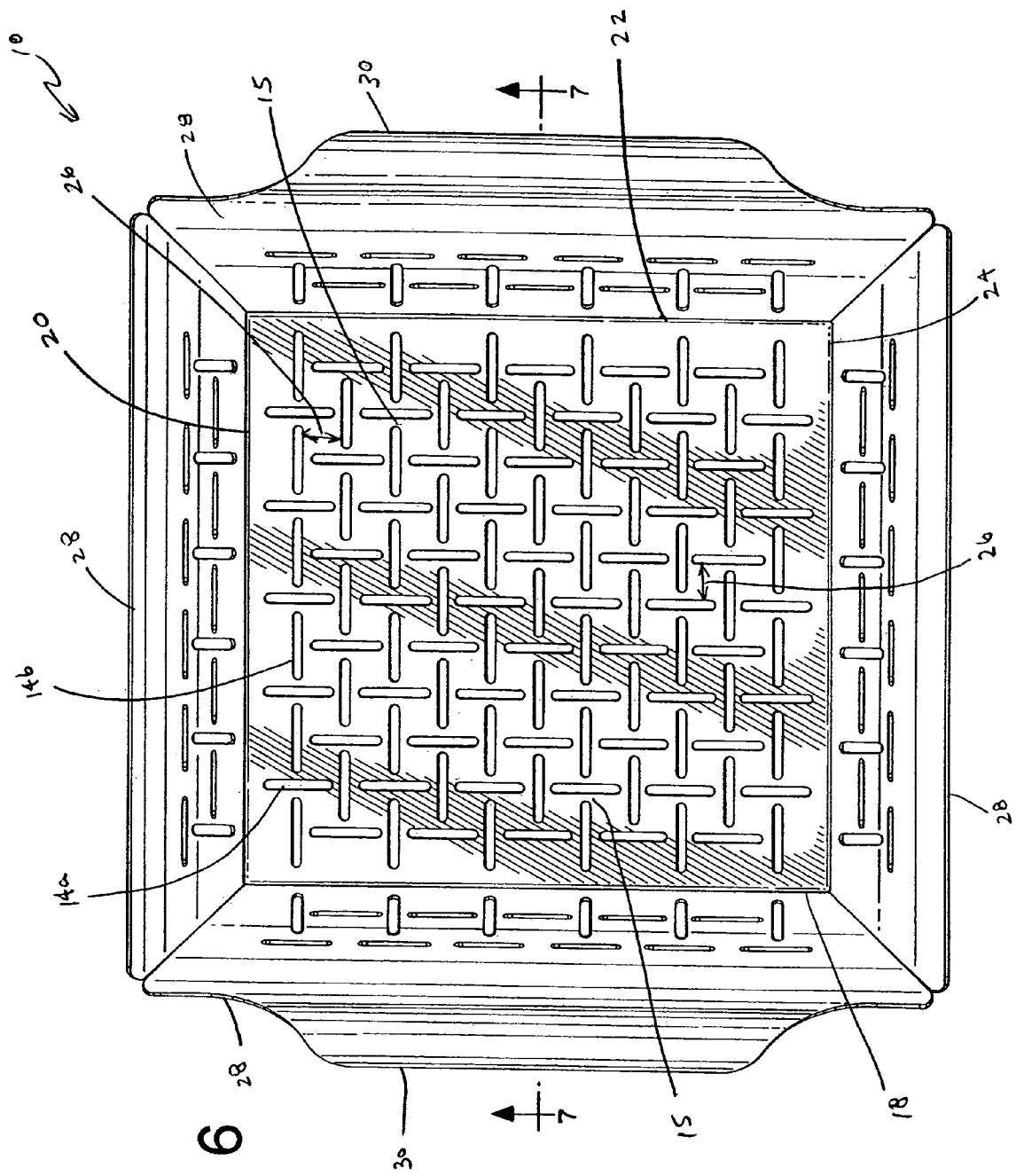
FIG. 6 is a top plan view of the grilling apparatus of FIG. 5.

The cooking grate 12 is designed such that the location and dimension of the apertures 14 on the cooking grate 12 substantially precludes thermal stresses from accumulating in any direction across the cooking grate 12, thereby lessening the potential for warping of the cooking grate 12. As shown in FIGS. 1-8, the apertures 14 extend through the cooking area 16, from the cooking surface 19 through to the opposing bottom surface 21 of the cooking grate 12. In a preferred embodiment, the apertures 14 are provided in a spaced transverse relationship. Specifically, as best shown in FIGS. 2 and 6, the apertures 14 comprise a plurality of vertical apertures 14a and a plurality of horizontal apertures 14b. Further, in the preferred embodiment, the vertical apertures 14a alternate with the horizontal apertures 14b in a recurring pattern in the cooking area 16 of the cooking grate 12.

In preferred embodiments, the apertures 14 comprise elongated slots having a radiused end. It is understood, however, that the apertures 14 may have any configuration, including those shown in FIGS. 9-13. In the preferred embodiment, the elongated slots 14 are approximately 0.125" wide, and 1.00" long. Further, in a particular row, the vertical slots 14a are approximately 1.375" apart. Similarly, adjacent rows of horizontal slots 14b are approximately 1.375" apart. A gap 15 exists between the vertical apertures 14a and the horizontal apertures 14b. In the embodiment shown in FIGS. 1-8, the gap 15 length is equal to the width of the slots. In an alternate embodiment, the gap 15 length is equal to twice the thickness of the metal used for the cooking grate 12, however, a length greater or less than this amount can be utilized as long as the rigidity of the cooking grate 12 is not comprised, and as long as the accumulation of thermal stresses is minimized.

As explained above, the embodiment shown in FIGS. 5-8 discloses a plurality of apertures 14 in the sidewalls 28 of the cooking grate 12. It is understood that even if the sidewalls 28 are not enlarged apertures may reside therein. Like the apertures 14 in the cooking area 16 of the cooking grate 12, the apertures 14 in the sidewalls 28 extend from a top surface 23 of the sidewalls 28 through to the opposing bottom surface 25 of the sidewall 28 of the cooking grate 12. The apertures 14 are arranged on the sidewall 28 to preclude uninterrupted extension of a transverse plane between the apertures 14 in the sidewall 28. The apertures 14 in the sidewalls 28 may be configured similarly or different from the apertures 14 in the cooking area 16 of the cooking grate 12. In a preferred embodiment, the apertures 14 in the sidewall 28 are configured similarly to the apertures 14 in the cooking area 16 of the cooking grate 12. As shown in FIGS. 5-8, the apertures 14 in the sidewalls 28 of the preferred embodiment comprise a plurality of elongated slots having a radiused end as explained above. More specifically, they comprise a plurality of vertical apertures 14a and a plurality of horizontal apertures 14b that are provided in a spaced transverse relationship as explained above. Further, like the apertures 14 in the cooking area 16, in the sidewall 28 the vertical apertures 14a alternate with the horizontal apertures 14b in a recurring pattern. It is understood, however, that the apertures 14 may have any configuration.

Further, in many prior art cooking grates utilizing sidewalls, the sidewalls were directly connected, typically by a tack weld, to adjacent sidewalls. This was provided to impart additional rigidity to the cooking grate, and to thereby attempt to overcome any forces that may tend to warp or twist the cooking grate due to the accumulation of thermal stresses in the cooking grate. Because the present cooking grate 12 provides apertures 14 dimensioned and arranged in a novel manner to reduce the accumulation of thermal stresses in the cooking grate 12, the sidewalls 28 do not have to be directly connected (i.e., via tack welding) to adjacent sidewalls 28.

Figure 9:
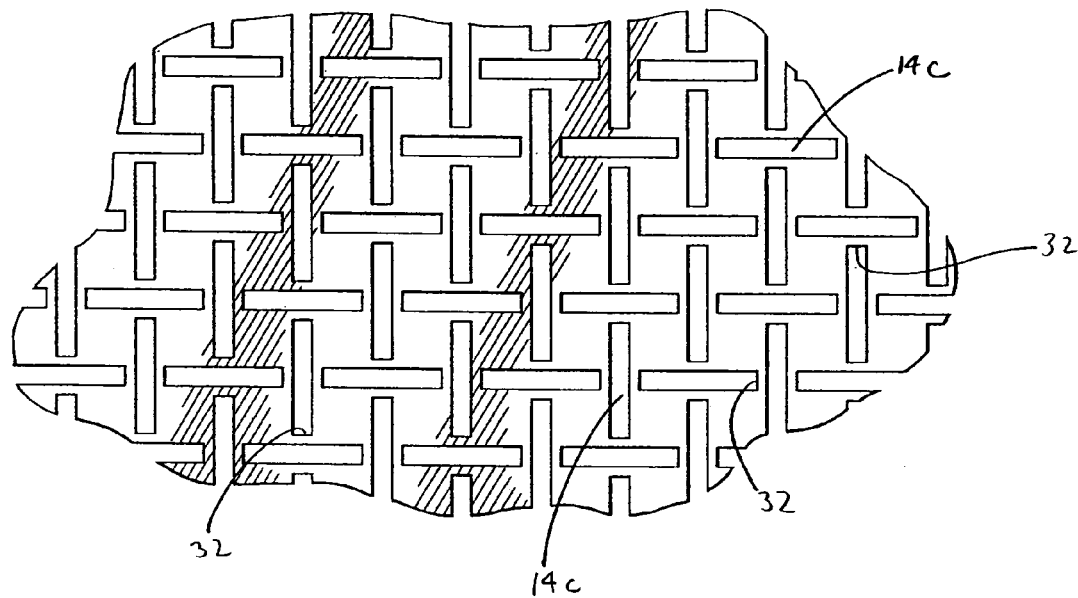
FIG. 9 is a partial plan view of an alternate aperture pattern for the grilling apparatus.
Figure 10:
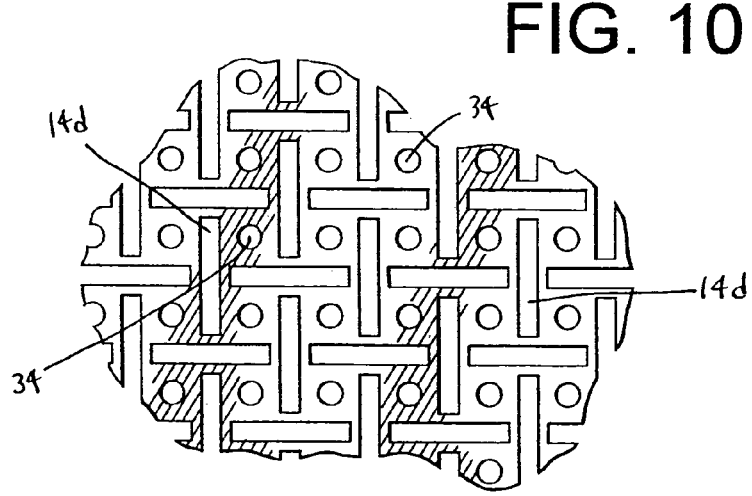
FIG. 10 is a partial plan view of an alternate aperture pattern for the grilling apparatus.
Figure 11:
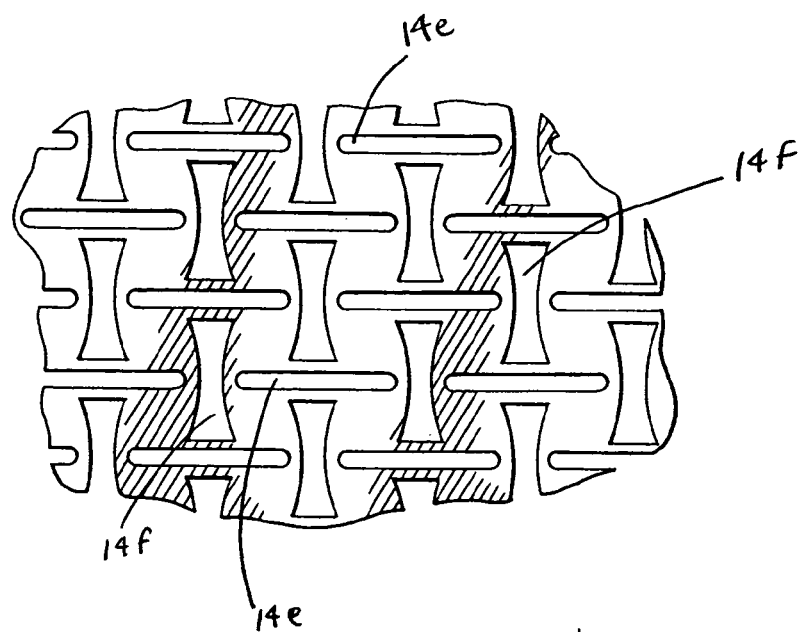
FIG. 11 is a partial plan view of an alternate aperture pattern for the grilling apparatus.
Figure 12:
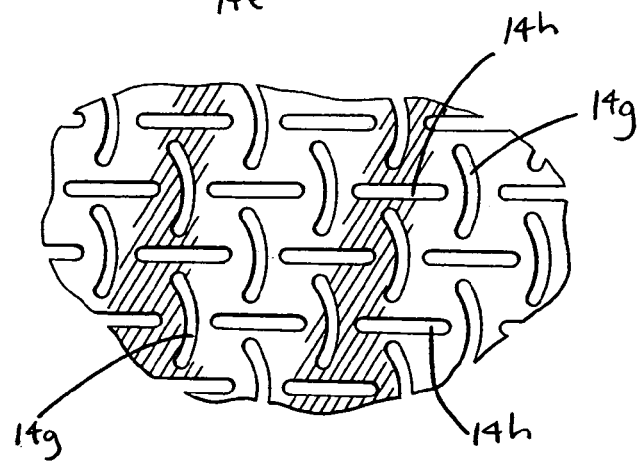
FIG. 12 is a partial plan view of an alternate aperture pattern for the grilling apparatus.
Figure 13:
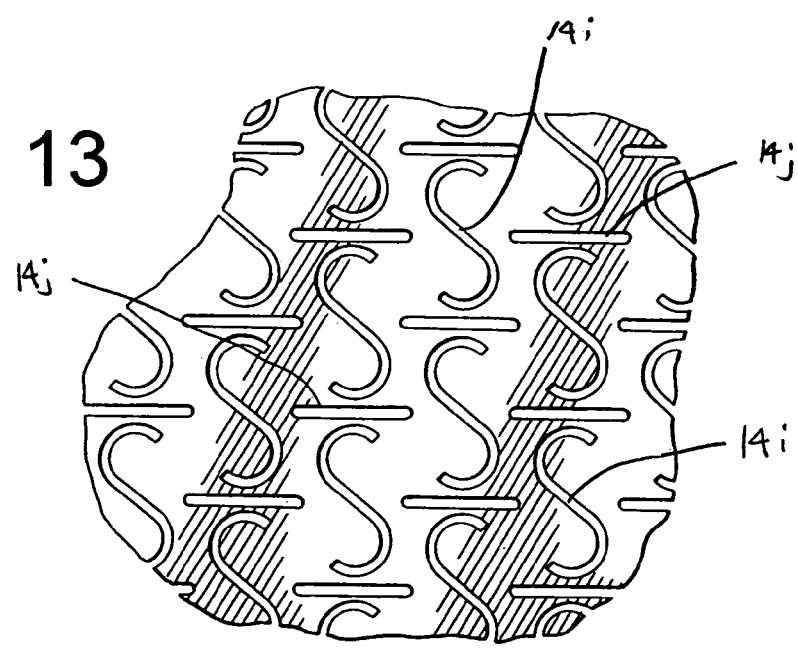
FIG. 13 is a partial plan view of an alternate aperture pattern for the grilling apparatus.

Alternate aperture 14 configurations are provided in FIGS. 9-13. As is understood by those having ordinary skill in the art, numerous other aperture configurations, other than the specific configurations disclosed, are possible without departing from the scope of the present invention. For example, FIG. 5 displays a similar aperture pattern to that disclosed in the embodiment of FIG. 1, however the apertures 14c have flat ends 32 instead of the radiused ends of the apertures 14 in FIG. 1. FIG. 6 displays an aperture pattern that employs an additional aperture 34 in the form of a circle between the other apertures 14d, however the additional aperture 34 could have any shape. The additional aperture 34 assists in providing additional access for heat and smoke to reach the food on the cooking grate 12. FIG. 7 discloses an aperture pattern employing both elongated apertures 14e and concave/convex apertures 14f. FIG. 8 discloses an aperture pattern employing semi-circular apertures 14g and elongated apertures 14h. FIG. 9 discloses an aperture pattern employing "S" shaped apertures 14i and elongated apertures 14j. Additionally, it is understood that the aperture pattern may be slanted or configured on an angle across the cooking grate 12.

The location and arrangement of the apertures 14a and 14b on the cooking grate 12 substantially precludes an uninterrupted line from extending between the apertures 14 across the cooking area 16 of the cooking grate 12, and thus generally from one edge of the cooking grate 12 to an opposing edge of the cooking grate 12, including substantial distances therebetween. Accordingly, if a transverse plane were provided through the cooking area 16, the transverse plane would not extend across the cooking area 16 from the first edge 18 to the opposing second edge 20 (or from the third edge 22 to the opposing fourth edge 24) without interruption by an aperture 14. Put another way, the location and dimension of the apertures 14 on the cooking grate 12 precludes uninterrupted extension of a transverse plane across the cooking area 16 and between the apertures 14 thereof. In such a configuration, all of the thermal expansion forces are limited to being independent local forces, as opposed to accumulated local forces, because the hole pattern of the apertures 14 allows for absorbing the thermal expansion energy.

Additionally, as is seen in FIGS. 1-8, in the present invention a continuous line 26 in the cooking area 16 extends a length (L1). The continuous line 26 is typically between the apertures 14 in the cooking area 16 of the cooking grate 12. The length (L1) of the continuous line 26 of the cooking area 16 is substantially less than the distance from one edge of cooking grate 12 to an opposing edge of the cooking grate 12. For example, as seen in FIG. 2, the length (L1) of the continuous line 26 is substantially less than the distance from the first edge 18 of the cooking grate 12 to the second edge 20 of the cooking grate 12. In a preferred embodiment, the apertures 14 are dimensioned such that any continuous line 26 in the cooking area 16 between apertures 14, and extending in a linear direction, extends a distance less than 40%, and preferably less than 30%, and most preferably less than 20% of an overall length of the cooking grate 12 in that linear direction. By precluding elongated uninterrupted extension of a continuous linear line 26 of the cooking area, the longest continuous element of the cooking area 16 is kept to a short length and terminates at one of the apertures 14. Accordingly, as the cooking area 16 expands and contracts during heating and cooling, and during placement of cool foods and other items on a warm surface in cooking, thermal stresses on cooking area 16 will not accumulate to cause warping. Rather, the location of the apertures 14 prevents the cooking area 16 from expanding a significant amount in any direction. In such a configuration, the size of the apertures 14 adjusts (expands and contracts) due to the thermal forces, assisting in preventing the cooking grate 12 from warping because the thermal forces are not transmitted across the apertures 14.

Figure 14:
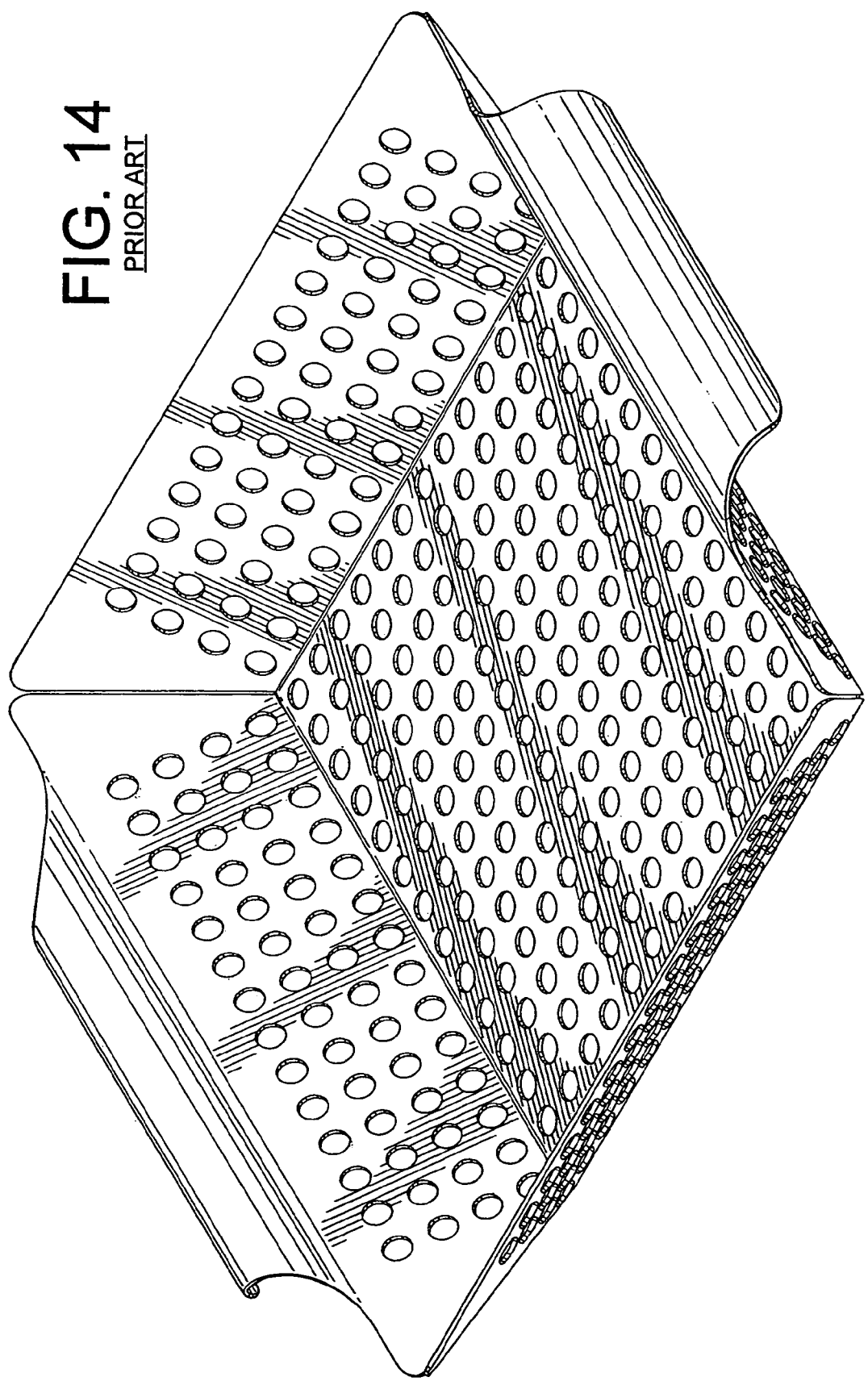
FIG. 14 is a perspective view of a prior art device.
Figure 15:
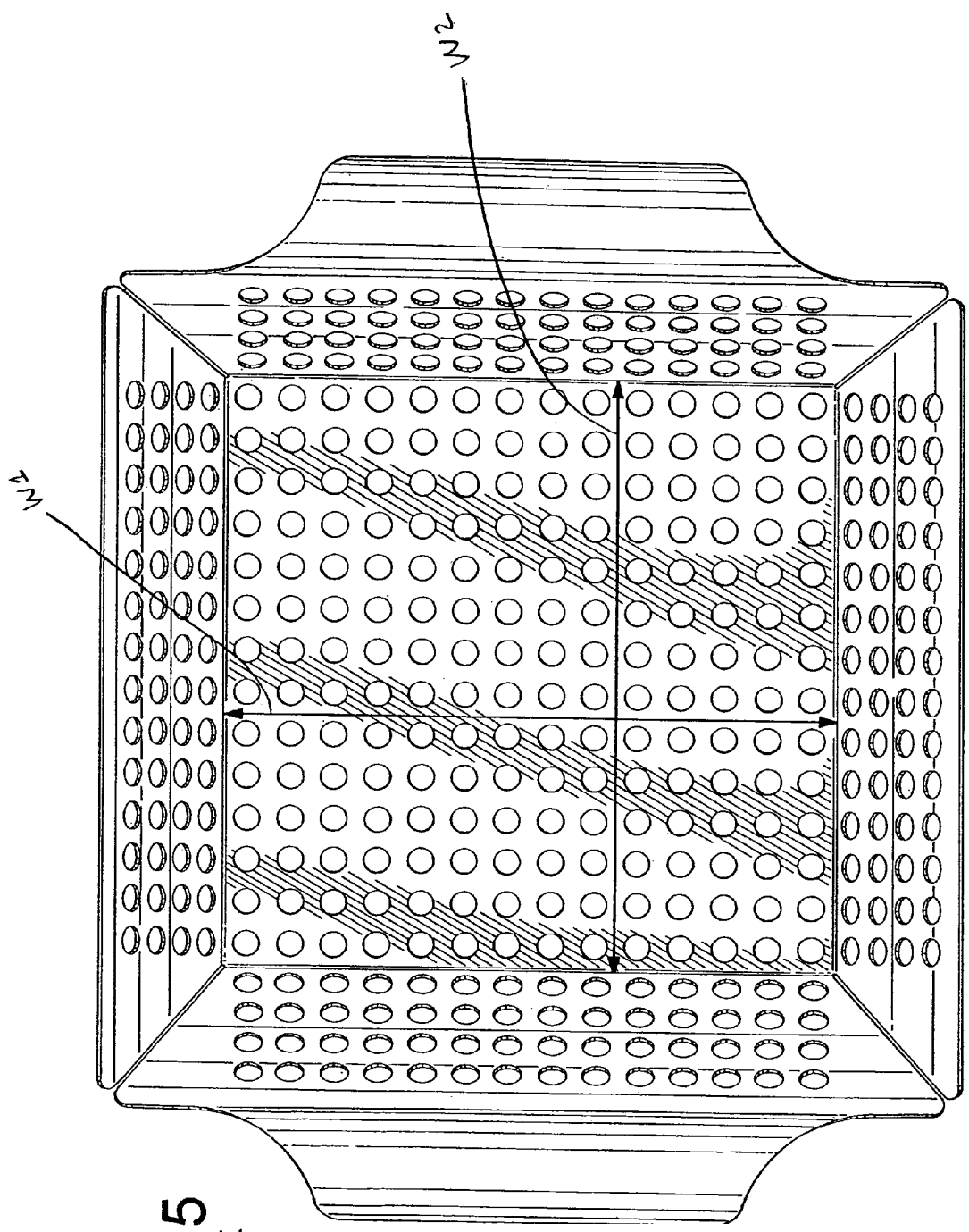
FIG. 15 is top plan view of the prior art device of FIG. 14.

Such a location and dimensioning of the apertures of the present invention is in direct distinction from the apertures provided in the prior art devices. As shown in FIGS. 14 and 15, the apertures in the prior art devices are located in a column and row grid-type arrangement. Accordingly, any continuous line (W1, W2) on the cooking area and between the apertures of the prior art devices extends uninterrupted a substantial distance, and typically extends uninterrupted from one edge of the cooking area to the opposing edge of the cooking area.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," and "third" as used herein are intended for illustrative purposes only and do not limit the embodiments in any way. Further, the term "plurality" as used herein indicates any number greater than one, either disjunctively or conjunctively, as necessary, up to an infinite number.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

While the specific embodiments have been illustrated and described, numerous modifications come to mind without significantly departing from the spirit of the invention, and the scope of protection is only limited by the scope of the accompanying claims.

What is claimed is:

1. A grill apparatus for placement above a heat source, comprising: a cooking grate formed from sheet metal and having a cooking area, the cooking area having a perimeter that is positioned a distance from an edge of the cooking grate; and, a plurality of apertures extending through the cooking area, wherein the apertures are arranged on the cooking grate to substantially preclude uninterrupted extension of a transverse plane across the cooking area of the cooking grate.

2. The grill apparatus of claim 1, wherein the apertures are positioned in a recurring pattern on the cooking area of the cooking grate.

3. The grill apparatus of claim 1, further comprising a sidewall extending from the edge of the cooking grate.

4. The grill apparatus of claim 3, further comprising a plurality of apertures extending through the sidewall, wherein the apertures are arranged on the sidewall to preclude uninterrupted extension of a transverse plane between the apertures on the sidewall.

5. The grill apparatus of claim 1, wherein the apertures are elongated, and wherein a plurality of the apertures extends transverse to one another.

6. The grill apparatus of claim 1, further comprising a plurality of sidewalls extending from the edge of the cooking grate.

7. The grill apparatus of claim 6, wherein the sidewalls are not directly connected to an adjacent sidewall.

8. The grill apparatus of claim 1, wherein the apertures comprise alternating vertical and horizontal slots.

9. A grill apparatus for placement above a heat source, comprising: a cooking grate formed from sheet metal and having a first edge, a second edge opposing the first edge, a third edge, and a fourth edge opposing the third edge; a cooking area located between the edges of the cooking grate; and, a plurality of apertures extending through the cooking area of the cooking grate, wherein the location of the apertures on the cooking grate precludes uninterrupted extension of a transverse plane across the cooking area and between the apertures thereof.

10. The grill apparatus of claim 9, further comprising a sidewall extending from one of the edges of the cooking grate.

11. The grill apparatus of claim 9, wherein a handle extends from one of the edges of the grate.

12. The grill apparatus of claim 10, further comprising a plurality of sidewalls extending at an angle from the cooking grate, the sidewalls having a plurality of apertures therein.

13. The grill apparatus of claim 9, wherein the apertures are elongated, and wherein a plurality of the apertures extends transverse to one another.

14. The grill apparatus of claim 9, wherein the cooking area is substantially flat.

15. The grill apparatus of claim 12, wherein the sidewalls are not directly connected to an adjacent sidewall.

16. A grill apparatus for placement above a heat source, comprising: a cooking grate having a plurality of opposing edges; a cooking area positioned between the opposing edges; and, a plurality of apertures extending through the cooking area, wherein a continuous linear line in the cooking area extends a length between the apertures, and wherein the length of the continuous line in the cooking area is substantially less than the distance from one edge of the cooking grate to an opposing edge of the cooking grate.

17. The grill apparatus of claim 16, wherein the apertures are provided in a recurring pattern about the cooking area.

18. The grill apparatus of claim 17, further comprising a plurality of sidewalls extending from the cooking grate, the sidewalls having a plurality of apertures therein in the same pattern as the apertures in the cooking area.

19. The grill apparatus of claim 16, wherein the apertures comprise transverse slot.

20. The grill apparatus of claim 19, wherein the apertures comprise alternating vertical and horizontal slots.

21. A grill apparatus for placement above a heat source, comprising: a cooking grate having a plurality of apertures extending through the cooking grate, and a cooking area of the cooking grate extending around the apertures, wherein the apertures are dimensioned such that any continuous linear line in the cooking area between the apertures and extending in a first direction extends a distance less than 40% of an overall length of the cooking grate in the first direction.

22. The grill apparatus of claim 21, wherein the continuous line of the cooking area between the apertures and extending in the first direction extends a distance less than 30% of an overall length of the cooking grate in the first direction.

23. The grill apparatus of claim 21, wherein the continuous line of the cooking area between the apertures and extending in the first direction extends a distance less than 20% of an overall length of the cooking grate in the first direction.

* * * * *